US009787782B2

United States Patent
Sweeney et al.

(10) Patent No.: US 9,787,782 B2
(45) Date of Patent: *Oct. 10, 2017

(54) SYSTEM AND METHOD FOR MANAGING EVENTS ASSOCIATED WITH THE DETECTION OF WIRELESS DEVICES

(71) Applicant: CenturyLink Intellectual Property LLC, Denver, CO (US)

(72) Inventors: Jeffrey M. Sweeney, Tucson, AZ (US); Kelsyn D. S. Rooks, Overland Park, KS (US); Shekhar Gupta, Lower Gwynedd, PA (US); Kendra Dwyer, Wellsville, KS (US); Mark Wilmoth, Gardner, KS (US)

(73) Assignee: Century Link Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,921

(22) Filed: Apr. 28, 2015

(65) Prior Publication Data

US 2015/0237150 A1 Aug. 20, 2015

Related U.S. Application Data

(63) Continuation of application No. 14/048,103, filed on Oct. 8, 2013, now Pat. No. 9,049,539, which is a continuation of application No. 12/256,337, filed on Oct. 22, 2008, now Pat. No. 8,554,214.

(51) Int. Cl.
H04L 29/08 (2006.01)
H04W 8/00 (2009.01)
H04W 4/04 (2009.01)

(52) U.S. Cl.
CPC .............. *H04L 67/18* (2013.01); *H04W 4/04* (2013.01); *H04W 8/005* (2013.01)

(58) Field of Classification Search
CPC .................................................... H04L 67/18
See application file for complete search history.

(56) References Cited

U.S. PATENT DOCUMENTS

| 5,187,808 A * | 2/1993 | Thompson | H04W 24/00 |
| | | | 455/518 |
| 8,554,214 B2 | 10/2013 | Sweeney et al. | |
| 9,049,539 B2 | 6/2015 | Sweeney et al. | |
| 2004/0243257 A1 | 12/2004 | Theimer | |

(Continued)

OTHER PUBLICATIONS

U.S. Appl. No. 12/256,337; Final Rejection dated Nov. 9, 2012; 19 pages.

(Continued)

Primary Examiner — Mazda Sabouri
(74) Attorney, Agent, or Firm — Swanson & Bratschun, L.L.C.

(57) ABSTRACT

The disclosed embodiments provide a system and method for managing events associated with the detection of wireless devices. The disclosed embodiments utilize a residential wireless access point for detecting the signal transmitted by a wireless device. A user configures a wireless device detection program to perform specified events in response to the detection and/or absence of a wireless device. The disclosed embodiments may provide home automation functions, home security functions, and/or provide child monitoring features.

20 Claims, 8 Drawing Sheets

(56) References Cited

U.S. PATENT DOCUMENTS

| | | | |
|---|---|---|---|
| 2006/0122712 | A1 | 6/2006 | Sugiyama |
| 2008/0155429 | A1 | 6/2008 | Frank et al. |
| 2008/0180228 | A1 | 7/2008 | Wakefield et al. |
| 2008/0221715 | A1 | 9/2008 | Krzyzanowski et al. |
| 2008/0261605 | A1* | 10/2008 | Larsen .................. H04L 29/06 455/446 |
| 2009/0022096 | A1 | 1/2009 | Walley et al. |
| 2009/0170531 | A1* | 7/2009 | Hampel ............. H04L 12/5865 455/456.3 |
| 2009/0193415 | A1* | 7/2009 | Narayanaswami ..... G06F 9/542 718/100 |
| 2009/0240395 | A1 | 9/2009 | Garg |
| 2009/0253554 | A1 | 10/2009 | McIntosh |
| 2009/0269063 | A1 | 10/2009 | Bernard et al. |
| 2009/0305671 | A1 | 12/2009 | Luft et al. |
| 2010/0099410 | A1 | 4/2010 | Sweeney et al. |
| 2010/0291907 | A1 | 11/2010 | MacNaughtan et al. |
| 2014/0038586 | A1 | 2/2014 | Sweeney et al. |

OTHER PUBLICATIONS

U.S. Appl. No. 12/256,337; Final Rejection dated Apr. 10, 2012; 18 pages.

U.S. Appl. No. 12/256,337; Final Rejection dated Jun. 3, 2011; 18 pages.

U.S. Appl. No. 12/256,337; Issue Notification dated Sep. 18, 2013; 1 page.

U.S. Appl. No. 12/256,337; Non-Final Rejection dated Dec. 23, 2010; 28 pages.

U.S. Appl. No. 12/256,337; Non-Final Rejection dated Aug. 10, 2012; 18 pages.

U.S. Appl. No. 12/256,337; Non-Final Rejection dated Sep. 14, 2011; 16 pages.

U.S. Appl. No. 12/256,337; Notice of Allowance dated May 30, 2013; 23 pages.

U.S. Appl. No. 12/256,337; Response to Amendment under Rule 312 dated Sep. 6, 2013; 3 pages.

U.S. Appl. No. 14/048,103; Issue Notification dated May 13, 2015; 1 page.

U.S. Appl. No. 14/048,103; Non-Final Rejection dated Aug. 4, 2014; 13 pages.

U.S. Appl. No. 14/048,103; Notice of Allowance dated Jan. 28, 2015; 12 pages.

U.S. Appl. No. 14/048,103; Notice of Allowance dated Nov. 7, 2014; 11 pages.

* cited by examiner

FIGURE 5

List Of Proximity Events 412

510:
- Turn on lights in — Location List
- Turn on shower in — Bathroom List
- Turn off alarm system
- Adjust air conditioning to [X] degrees
- Adjust heat to [X] degrees
- Turn on music to — Music Options
- Turn on Television to — Channel Options 512:
- Send Text Message to — Phone Numbers List
- Email — Email List etc....
......

List Of Departure Events 417

514:
- Turn off lights in — Location List
- Turn on lights in — Location List
- Turn on alarm system
- Adjust air conditioning to [X] degrees
- Adjust heat to [X] degrees
- Turn off music
- Turn off Television
- Send Text Message to — Phone Numbers List
- Email — Email List
- etc....
....

List Of Unknown Device Events 422

516:
- Sound alarm system
- Turn on lights in — Location List
- etc....
.....
- Send Text Message to — Phone Numbers List
- Email — Email List

FIGURE 6

Data Table 600

| Device Nickname | Access Point ID | Wireless Device ID | Event Conditions | Event |
|---|---|---|---|---|
| Dad's Blackberry | 00-B0-D0-86-BB-F7 | 00-0C-F1-56-98-AD | Detected | Adjust air to 78 |
| Mom's Phone | 00-B0-D0-86-BB-F7 | 214-785-4561 | Detected | Turn on Kitchen light |
| John's Phone | 00-B0-D0-86-BB-F7 622 | 214-785-4611 630 | Detected &(!Mom) | Send Txt Message to Dad |
| John's Phone | 00-B0-D0-86-BB-F7 624 | 214-785-4611 | Not Detected | Send Txt Message to Dad |
| John's Phone | 00-OG-23-8U-22-AC | 214-785-4611 | Detected | Send Txt Message to Dad |
| Dad's Blackberry<br>Mom's Phone<br>John's Phone | 00-B0-D0-86-BB-F7 | 00-0C-F1-56-98-AD<br>214-785-456<br>214-785-4611 | Not Detected<br><br><br>636 | (if day) Turn off all lights in house<br>(else) Turn off all lights except hallway<br>(and) 640<br>Turn on Alarm system |
| Unknown Device | 00-B0-D0-86-BB-F7 | | Detected | Send Txt Message to Dad<br>Send Email to Mom<br>Identify Unknown Device 642 |
| etc.... | | | | |
| | | | | |
| | | | | |
| | | | | |
| | | | | |

602 → Device Nickname
604 → Access Point ID
606 → Wireless Device ID
608 → Event Conditions (628)
610 → Event (634)
620 → John's Phone row

SYSTEM AND METHOD FOR MANAGING EVENTS ASSOCIATED WITH THE DETECTION OF WIRELESS DEVICES

CROSS REFERENCE TO RELATED APPLICATIONS

This application is a Continuation of U.S. patent application Ser. No. 14/048,103, filed Oct. 8, 2013 by Jeffrey M. Sweeney et al. entitled, "System and Method for Managing Events Associated with the Detection of Wireless Devices", which is a Continuation of U.S. patent application Ser. No. 12/256,337 (Now U.S. Pat. No. 8,554,214), filed Oct. 22, 2008 by Jeffrey M. Sweeney et al. entitled "System and Method For Managing Events Associated With The Detection Of Wireless Devices", both of which is hereby incorporated by reference in its entirety.

BACKGROUND OF THE INVENTION

Field of the Invention

The principles of the present invention relate to computers, and more specifically, to managing events associated with the detection of wireless devices.

Description of the Related Art

Mobile devices, such as, cellular phones and personal digital assistants (PDAs), are often configured with short range wireless transmitters to enable wireless communication over a network. The signals transmitted by the wireless transmitters may be detected by a base station when the device is within the proximity of the base station. A base station is a radio receiver/transmitter that serves as the hub of a local wireless network and may also be the gateway to a wired network.

SUMMARY

According to one embodiment of the invention, a method for managing events associated with the detection of a wireless device is presented. The method includes receiving data from one of a plurality of residential wireless access points, the plurality of residential wireless access points being located at different residential locations. The method identifies from the data an identifier associated with a residential wireless access point and a wireless device that is detected by the residential wireless access point. The method determines whether the wireless device is registered with the residential wireless access point. In response to the wireless device being registered with the residential wireless access point, the method performs a user-specified event associated with the wireless device being detected by the residential wireless access point.

BRIEF DESCRIPTION OF THE DRAWINGS

For a more complete understanding of the present application, the objects and advantages thereof, reference is now made to the following descriptions taken in conjunction with the accompanying drawings, in which:

FIG. 5 is an embodiment of a graphical user interface for selecting events associated with a wireless detection program;

FIG. 6 is an embodiment of a data table for managing events associated with a wireless detection program;

DETAILED DESCRIPTION OF THE DRAWINGS

The disclosed embodiments provide a system and method for managing events associated with the detection of a wireless device. The disclosed embodiments utilize a residential wireless access point for detecting the signal transmitted by a wireless device, such as, but not limited to, a cellular phone and/or a mobile computing device that utilizes a wireless protocol for transmitting and receiving data. As will be further described, the residential wireless access point is associated with a user. The user configures a wireless device detection program over a network to perform specified events in response to the detection a wireless device. For example, in some embodiments, wireless device detection program may provide, but is not limited to, home automation functions, home security functions, and/or provide child monitoring features.

Figure 1:
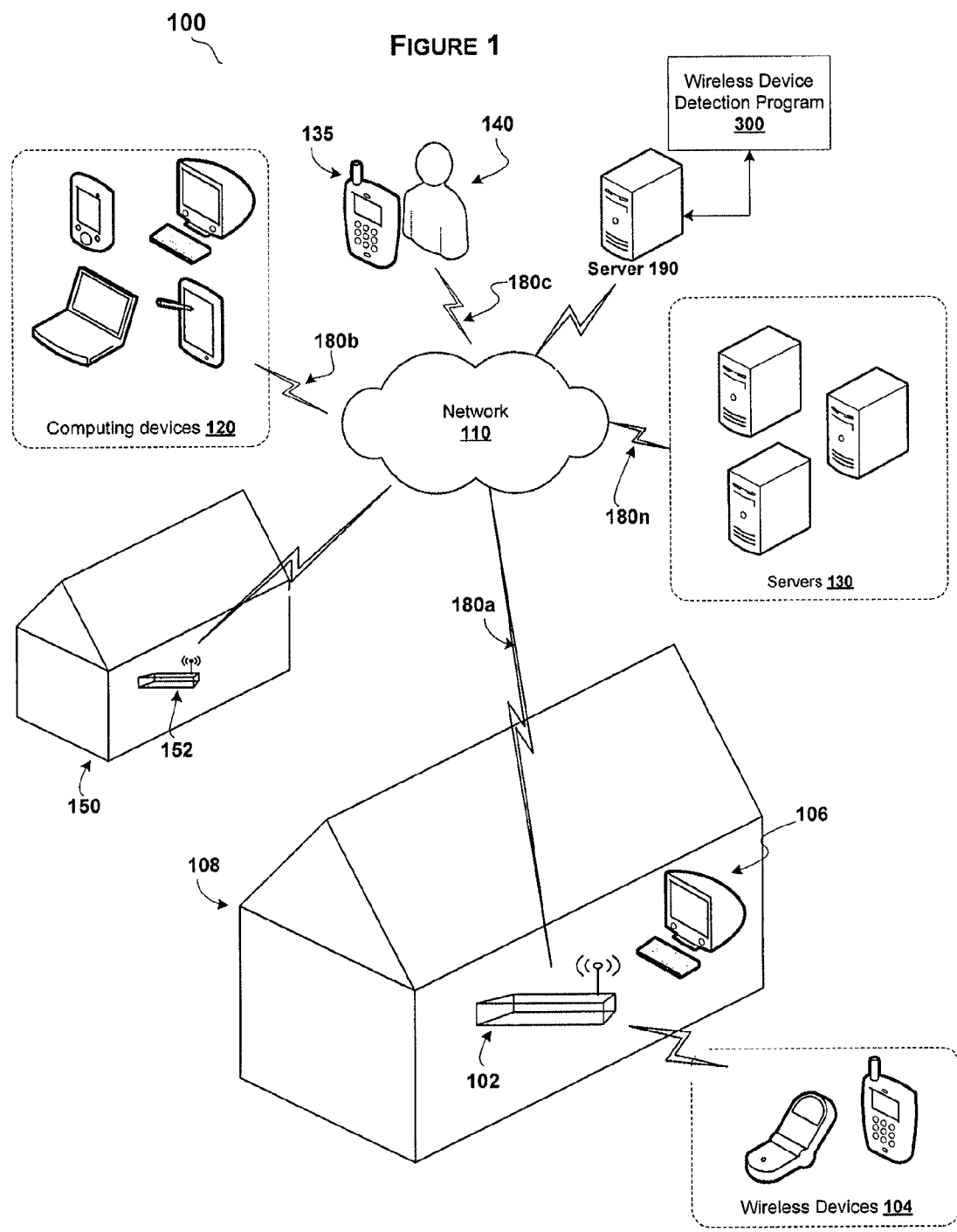
FIG. 1 depicts a environment in which the illustrative embodiments may be implemented.
Figure 2:
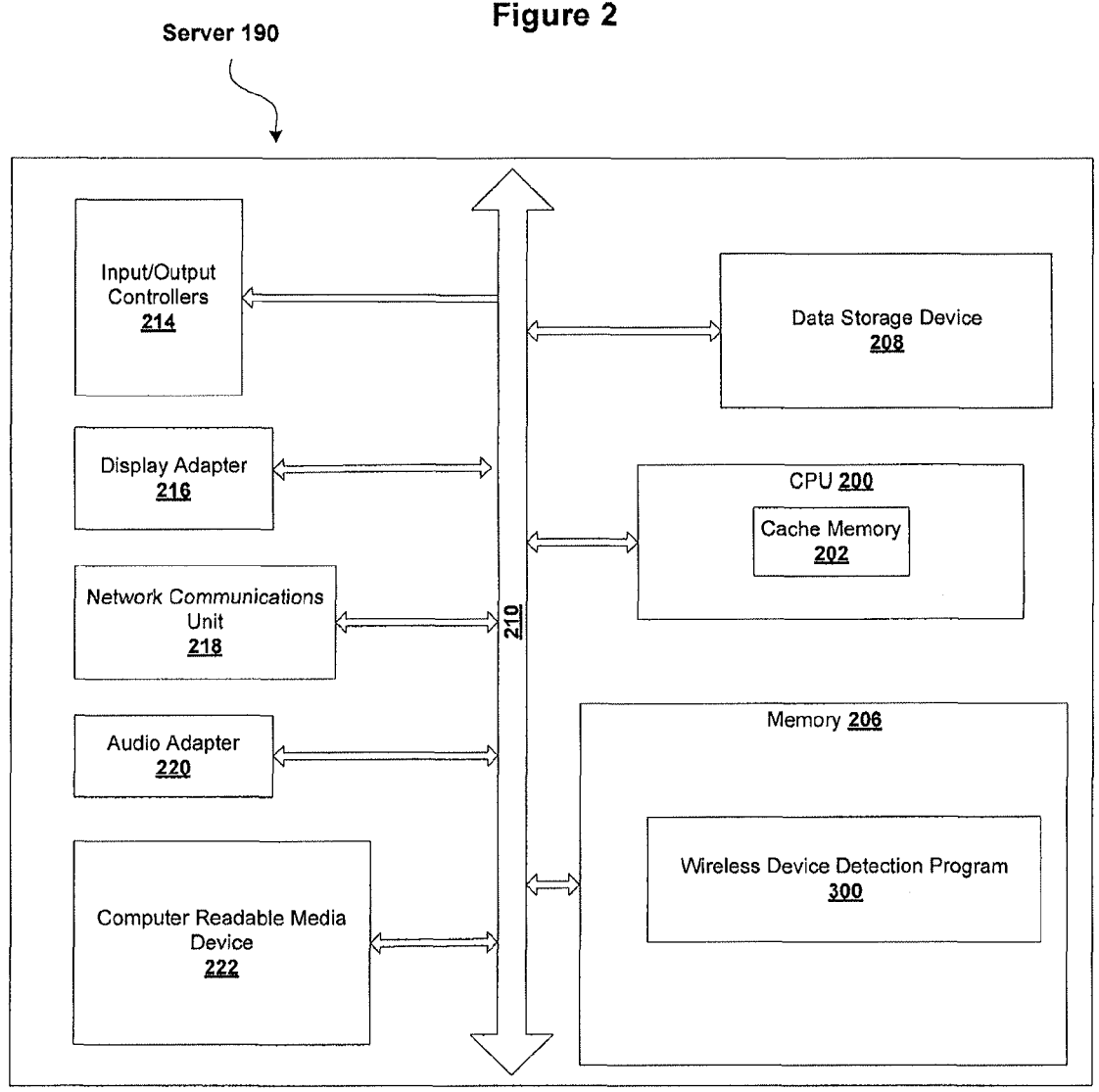
FIG. 2 is an embodiment of a computing device in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a network environment 100 in which the illustrative embodiments may be implemented. Network environment 100 includes network 110, which is the medium used to provide communications links between various devices and computers, such as, but not limited to, residential wireless access point 102, wireless devices 104, computing device 106, electronic device 135, computing devices 120, servers 130, and server 190 together within network environment 100. Network 110 may include connections 180a-180n, such as, but is not limited to, wire, wireless communication links, or fiber optic cables to each of the devices.

Residential wireless access point 102 is a wireless access point located in a residential location, such as, but not limited to, residential location 108. Residential location 108 may be any type of building including, but not limited to, a house, a residential complex, and/or a school building. Residential wireless access point 102 may be used to connect wired and wireless devices, such as, but not limited to, computing device 106 and wireless devices 104 to network 110. In some embodiments, residential wireless access point 102 detects cellular network signals, such as, but not limited to, Global System for Mobile Communications (GSM) and Code Division Multiple Access (CDMA) signals transmitted by a cellular device. For example, in some embodiments, residential wireless access point 102 may be a femto cell. A femto cell is a device used to improve mobile network coverage in small areas. Femto cells connect locally to mobile phones and similar devices through their normal GSM, CDMA, or UMTS connections, and then route the connections over a broadband internet connection back to the carrier, bypassing the normal cell towers. In addition, in some embodiments, residential wireless access point 102 may detect other wireless signals, such as, but not limited to, Wi-Fi, and Bluetooth signals and/or other wireless signals utilizing the Wireless Application Protocol (WAP) for providing secure data transmission. In addition, network environment 100 may include additional residential wireless access points (i.e., a plurality of residential wireless access points) located at different residential locations, such as, but not limited to, residential wireless access point 152 located at residential location 150.

Wireless devices 104 may include, but are not limited to, cellular phones, mobile computing device, pagers, two-way radios, smart phones, and/or any other mobile computing device that utilizes a wireless protocol for transmitting and receiving data.

Servers 130 may include one or more servers, such as, but not limited to web servers, database servers, file servers, mail servers, and application servers. In addition, computing devices 120 may be, for example, personal computers, network computers, laptops, personal digital assistants (PDAs), and/or smart phones. In the depicted example, servers 130 provide data and/or services to computing devices 120 and/or other clients connected to network 110. Network environment 100 may include additional servers, clients, and other devices not shown.

In some embodiments, network 110 is the Internet. The Internet is a global system of interconnected computer networks that interchange data using the standardized Internet Protocol Suite (TCP/IP). The Internet includes millions of private and public networks that are linked by copper wires, fiber-optic cables, wireless connections, and other technologies. Of course, network 110 may also be implemented as a number of different types of networks, such as, but not limited to, an intranet, a local area network (LAN), or a wide area network (WAN).

As previously stated, the disclosed embodiments provide a system and method for managing events associated with the detection of a wireless device, such as, but not limited to, wireless devices 104. The disclosed embodiments utilize a residential wireless access point, such as, but not limited to, residential wireless access point 102 for detecting a signal transmitted by wireless devices 104. Residential wireless access point 102 is associated with a user, such as, but not limited to, user 140. User 140 configures a wireless device detection program 300 to perform specified events in response to the detection wireless devices 104. For example, in some embodiments, user 140 utilizing computing device 106 may configure wireless device detection program 300 executing on server 190 over network 110. In some embodiments, wireless device detection program 300 may communicate with other data processing systems, such as, but not limited to, servers 130 to perform the user-specified event. As an example, in some embodiments, user 140 may configure wireless device detection program 300 to transmit a message, such as, but not limited to, a text message to an electronic device 135 in response to residential wireless access point 102 detecting a signal of a wireless device, such as, but not limited to, wireless devices 104. Electronic device 135 may be any type of electronic device including, but not limited to, a cellular/smart phone, a PDA, and/or a computing device associated with user 140.

With reference now to FIG. 2, an embodiment of server 190 in which the illustrative embodiments may be implemented is presented. In this embodiment, server 190 includes communications bus 210, which provides communications between central processing unit (CPU) 200, memory 206, data storage device 208, input/output (I/O) controllers 214, display adapter 216, network communications unit 218, audio adapter 220, and computer readable media device 222.

CPU 200 executes instructions for software that may be loaded into memory 206. CPU 200 may be a set of one or more processors or may be a multi-processor core, depending on the particular implementation. Further, CPU 200 may include one or more levels of cache memory, such as, but not limited to, cache memory 202. Cache memory 202 is used by CPU 200 to store copies of the data from the most frequently used main memory locations to reduce the average time to access memory.

Memory 206 is used to retain digital data used for processing. In some embodiments, memory 206 may be a random access memory (RAM). RAM memory allows the stored data to be accessed in any order as opposed to storage mechanisms, such as tapes and magnetic discs. In addition, memory 206 may include any other suitable volatile or non-volatile storage device.

CPU 200 loads computer executable instructions, such as, but not limited to, wireless device detection program 300 into memory 206 for execution. As will be further described, in some embodiments, wireless device detection program 300 may include one or more modules containing computer executable instructions for managing events associated with the detection of a wireless device. In addition, in some embodiments, CPU 200 in executing computer executable instructions associated with wireless device detection program 300 may execute instructions for sending and/or retrieving data from one or more computing devices. Further, in some embodiments, CPU 200 may execute in parallel with one or more processors on the same and/or different computing device in connection with executing the instructions associated with wireless device detection program 300.

Data storage device 208 may take various forms depending on the particular implementation. For example, data storage device 208 may be a hard drive, flash memory, rewritable optical disk, rewritable magnetic tape, or some combination thereof. The media used by data storage device 208 also may be removable, such as, but not limited to, a removable hard drive.

Input/output unit 214 may include one or more of the same and/or different types of data ports used for connecting external devices to server 190. Input/output unit 214 may include a serial port, a parallel port, an accelerated graphics port, and most commonly a universal serial bus (USB) port. For example, input/output unit 214 may be used to connect computer peripherals, such as mice, keyboards, PDAs, gamepads and joysticks, scanners, digital cameras, printers, personal media players, and flash drives.

Display adapter 216 is used to generate and output images to a display. Display adapter 216 may be a dedicated expansion card that is plugged into a slot on the motherboard of server 190 or may a graphics controller integrated into the motherboard chipset. In addition, display adapter 216 may include dedicated memory and one or more processing units.

Network communications unit 218 provides for communications with other data processing systems or devices. In these examples, network communications unit 218 is a network interface card. Modems, cable modem, Ethernet cards, and wireless interface cards are just a few of the currently available types of network interface adapters.

Network communications unit 218 may provide communications through the use of physical and/or wireless communications links.

Audio adapter 220 facilitates the input and output of audio signals to and from server 190. For example, audio adapter 220 may provide the audio component for multimedia applications, such as music composition, editing video or audio, presentation/education, and/or entertainment, such as video games. In some embodiments, audio adapter 220 may be an expansion card added to server 190 to provide for audio capability.

Computer readable media device 222 provides a mechanism for reading and writing to tangible forms of computer media, such as, but not limited to, a floppy disc, a compact disc (CD), a digital versatile disc (DVD), and memory cards. For example, CPU 200 may use computer readable media device 222 to read instructions stored on a computer media for executing the computer executable instructions of wireless device detection program 300.

The different components illustrated for server 190 are not meant to provide architectural limitations to the manner in which different embodiments may be implemented. For example, the different illustrative embodiments may be implemented in a data processing system including components in addition to or in place of those illustrated for server 190.

Figure 3:
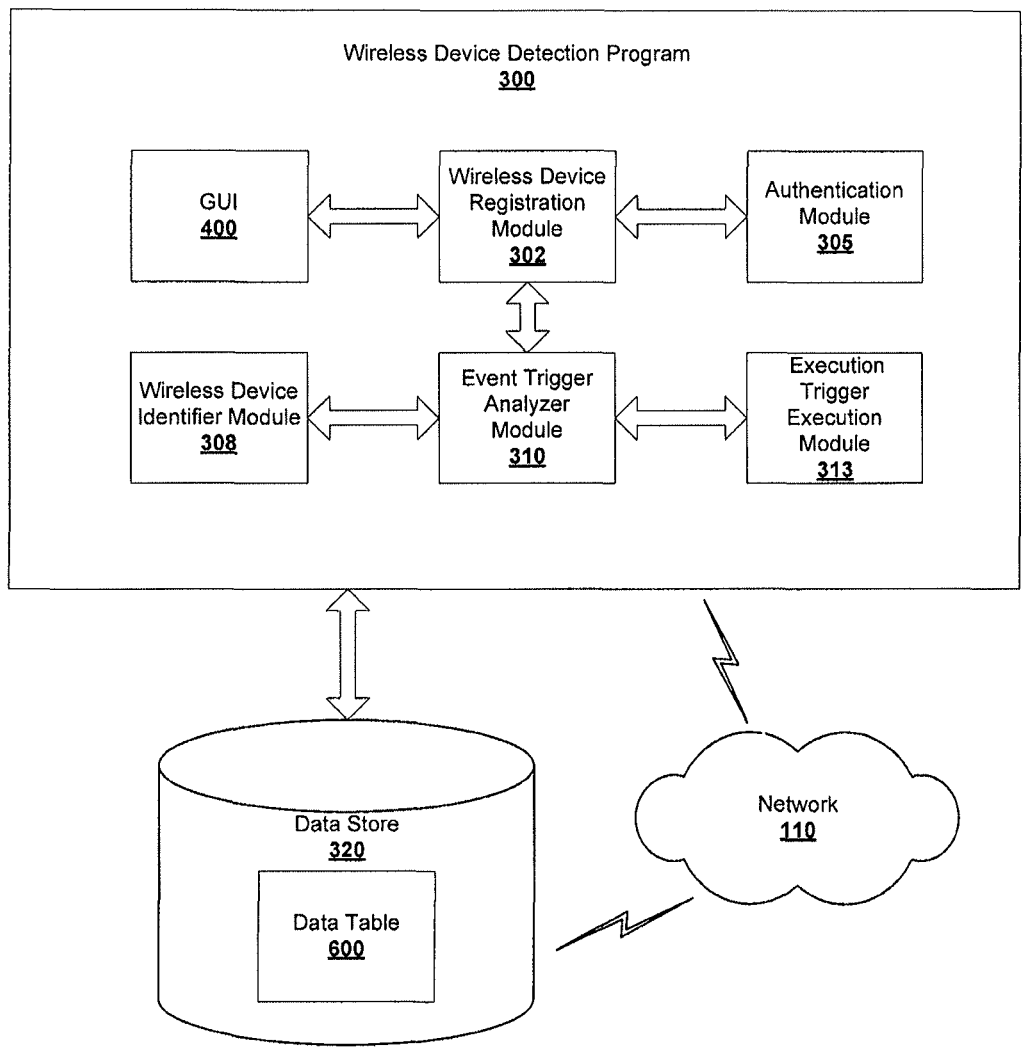
FIG. 3 is an embodiment of a wireless device detection program for managing events associated with the detection of wireless devices.

FIG. 3 is an embodiment of wireless device detection program 300 for managing events associated with the detection of a wireless device. In some embodiments, wireless device detection program 300 includes, among other modules, a graphical user interface (GUI) 400, wireless device registration module 302, authentication module 305, wireless device identifier module 308, event trigger analyzer module 310, execution trigger execution module 313.

Figure 4:
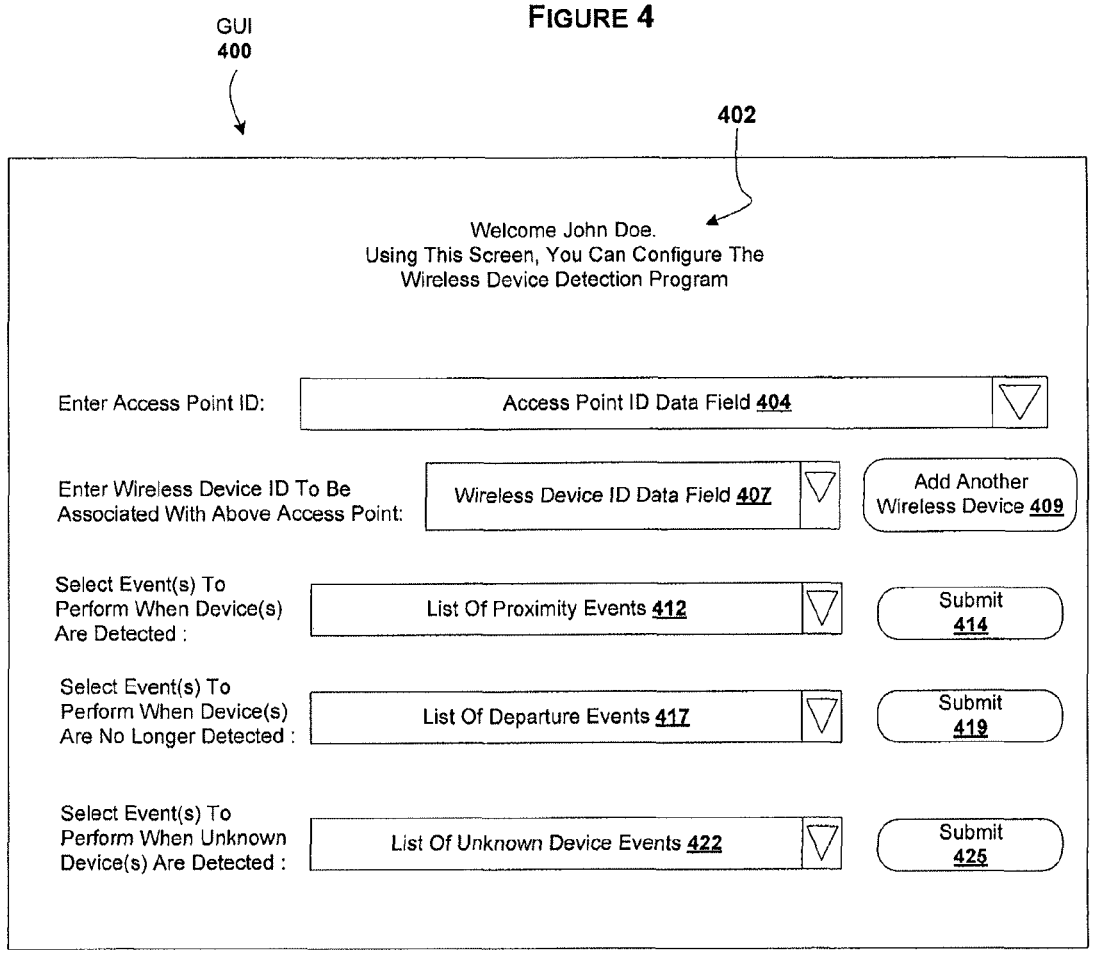
FIG. 4 is an embodiment of a graphical user interface for managing events associated with a wireless detection program.

Graphical user interface 400, as will be further described in FIG. 4, may be used to configure wireless device detection program 300. For instance, in some embodiments, user 140 may log into wireless device detection program 300 over network 110. Wireless device detection program 300 presents the user with graphical user interface 400. In some embodiments, graphical user interface 400 may be implemented as part of a web page. Alternatively, in some embodiments, graphical user interface 400 may be implemented as a separate software application.

Wireless device registration module 302 may be used for registering a residential wireless access point associated with user 140, such as, but not limited to, residential wireless access point 102. In addition, in some embodiments, wireless device registration module 302 may be used for configuring events associated with residential wireless access point 102 detecting known and/or unknown wireless devices, such as, but not limited to, wireless devices 104. Further, in some embodiments, wireless device registration module 302 may be used to configure the signal detection range of residential wireless access point 102. For instance, a user residing in an apartment complex may configure residential wireless access point 102 to detect wireless signals only within a small range.

In addition, in some embodiments, authentication module 305 provides secure access to wireless device detection program 300. For example, in some embodiments, authentication module 305 may be used to authenticate a username and/or password of user 140 prior to allowing user 140 to configure and/or access wireless device detection program 300. Thus, an unauthorized user may not alter the configurations settings of a residential wireless access point associated with another user.

Wireless device identifier module 308 identifies from received data the identity of a residential wireless access point associated with the data and wireless devices that are detected the identified residential wireless access point. In some embodiments, wireless device identifier module 308 extracts an identifier, such as, but not limited to, a Media Access Control (MAC) address to identify a particular residential wireless access point, such as, but not limited to, residential wireless access point 102. In addition, wireless device identifier module 308 may extract an identifier, such as, but not limited to, a MAC address and/or phone number associated with a wireless device detected by residential wireless access point 102 to identify the particular wireless device. In some embodiments, wireless device identifier module 308 may communicate with an external database and/or computing device to correlate the retrieved identifier of a wireless device with the identity of a person associated with the wireless device. For example, in some embodiments, as will be further described, if a wireless device detected by a particular residential wireless access point is not registered with the residential wireless access point (i.e., an unknown wireless device), wireless device identifier module 308 may retrieve subscriber data from a service provider subscriber database (e.g., servers 130) for identifying a person associated with the wireless device and provide the subscriber data to a user associated with the residential wireless access point.

Event trigger analyzer module 310 determines whether the conditions for performing a specified event associated with the detection of one or more wireless devices are met. For example, as will be further described, in some embodiments, a specified event may be associated with the detection of one or more specified wireless devices. For instance, in some embodiments, a user may specify that a condition, such as, but not limited to, turning on music occurs when a first wireless device (e.g., teenager's phone) is present and a second wireless device (dad's phone) is not present.

Execution trigger execution module 313 performs an event in response to a determination by event trigger analyzer module 310 that a condition is met. Execution trigger execution module 313 may communicate with one or more computing devices in performing the specified event. For example, in some embodiments, execution trigger execution module 313 may communicate with a home automation system to initiate home automated events, such as turning on the air conditioner. In another embodiment, execution trigger execution module 313 may communicate with a mail server for transmitting an email message to a specified user in response to a condition being met.

In some embodiments, the configuration data associated with wireless device detection program 300, such as, but not limited to, the identifiers of residential wireless access point 102 and wireless devices 104, event trigger conditions, and the data relating to executing an event may be stored in one or more local or remote data store, such as, but not limited to, data store 320. In some embodiments, data store 320 may be accessed by wireless device detection program 300 via network 110. In addition, in some embodiments, data store 320 may include one or more data tables, such as, but not limited to, data table 600.

FIG. 4 is an embodiment of graphical user interface 400 for managing events associated with a wireless detection program. In some embodiments, graphical user interface 400 may be presented as part of a web page and/or may appear as an individual window. Graphical user interface 400 is provided merely as an illustrative example and does not imply a particular design, implementation, and/or limitation of the disclosed embodiments. For example, in some embodiments, features/functions may be added, deleted, modified, and/or combined.

In the depicted embodiment, graphical user interface 400 includes a welcome message 402 identifying a user logged into wireless device detection program 300. In addition, graphical user interface 400 may include one or more data fields, such as, but not limited to, access point id data field 404, wireless device id data field 407, list of proximity events 412, list of departure events 417, and list of unknown device events 422.

Access point id data field 404 enables a user to manually enter in an identifier, such as, but not limited to, a MAC address associated with a residential wireless access point. In some embodiments, access point id data field 404 may include a pull down menu for enabling a user to select residential wireless access point previously associated with the user.

After selecting and/or entering a residential wireless access point associated with the user, wireless device id data field 407 enables a user to register an identifier associated with a wireless device that is associated with the selected/entered residential wireless access point. In some embodiments, a user may add additional wireless devices to be associated with the selected/entered residential wireless access point by selecting option add another wireless device 409. In addition, in some embodiments, wireless device id data field 407 may include a pull down menu to enable a user to select one or more previously registered wireless devices. For example, a particular event may be associated with the presence of two or more wireless devices.

In some embodiments, list of proximity events 412 displays a list of selectable events to perform in response to the detection of the wireless devices specified in wireless device id data field 407 by a residential wireless access point specified in access point id data field 404. In some embodiments, list of proximity events 412 may include a set of pre-configured events. Alternatively, in some embodiments, list of proximity events 412 may include user-created events uniquely associated with a particular user. In addition, in some embodiments, list of proximity events 412 may enable the user to select one or more events. Further, in some embodiments, a submit button 414 may be selected by a user to indicate submission of one or more selected proximity events of list of proximity events 412. In response to receiving a selection of submit button 414, wireless device detection program 300 stores the selected proximity events associated with the specified wireless devices and residential wireless access point to a data table, such as, but not limited to, data table 600.

Similarly, in some embodiments, list of departure events 417 may contain a list of selectable events to perform in response to detecting the absence of the wireless devices specified in wireless device id data field 407 by a residential wireless access point specified in access point id data field 404. In some embodiments, in determining whether a wireless device has departed from the signal range of an residential wireless access point, wireless device detection program 300 may monitor the strength of a signal associated with a wireless device to determine whether the wireless device has moved out of the detection range of a residential wireless access point in contrast to the wireless device being turned off. For example, if the signal strength of a wireless device is constant for a period of time and then abruptly ends, wireless device detection program 300 may determine that the wireless device has simply lost power. In contrast, if the signal strength of a detected wireless device gradually decreases, such as when a wireless device moves away from an residential wireless access point, wireless device detection program 300 identifies the wireless device has having left the detection range of the residential wireless access point once the signal of the wireless device is no longer detected by the residential wireless access point. In such cases, wireless device detection program 300 performs the user-selected events in list of departure events 417. Again, graphical user interface 400 may include a submit button 419 to enable a user to signify submission of the selected events in list of departure events 417 to wireless device detection program 300.

List of unknown device events 422 may be used to select one or more user-created events and/or pre-configured events to perform in response to the detection of an unknown wireless device by the residential wireless access point specified in access point id data field 404. For example, in some embodiments, if an unknown wireless device is detected within the signal range of residential wireless access point 102, a text message may be sent to a specified device associated with a user, such as, but not limited to, electronic device 135 associated with user 140. Submit button 425 enables a user to signify submission of the selected events in list of unknown device events 422 to wireless device detection program 300. Thus, in some embodiments, the disclosed embodiments may provide home security functions for residential location 108.

In addition, in some embodiments, wireless device detection program 300 may determine an estimated distance of a wireless device from the residential wireless access point based on the signal strength of the wireless device and provide that information to a user associated with the residential wireless access point. Further, in some embodiments, wireless device detection program 300 may monitor/log the amount of time a signal of a wireless device is detected.

FIG. 5 is an embodiment of a graphical user interface 500 for selecting events associated with wireless device detection program 300. Graphical user interface 500 includes examples of list of proximity events 412, list of departure events 417, and list of unknown device events 422. Graphical user interface 500 is provided merely as an illustrative example and does not imply a particular design, implementation, and/or limitation of the disclosed embodiments.

In the depicted example, list of proximity events 412 includes a plurality of events associated with the detection of a wireless device by a residential wireless access point. For example, list of proximity events 412 may include features 510 for performing home automation events, such as, but not limited to, turning on lights in a user-specified location, adjusting air conditioning/heating, and turning on music in response the detection of a specified wireless device. In addition, list of proximity events 412 may include monitoring features 512 for sending an email and/or text message to a user-specified email address/electronic device. Similarly, list of departure events 417 includes a plurality of events 514 associated with the determination that a particular wireless device has departed from the signal detection area of the residential wireless access point. List of unknown device events 422 includes one or more events 516 to perform in response to detecting the signal of an unknown wireless device by a residential wireless access point associated with a user. For example, in some embodiments, wireless device detection program 300 may transmit an email to a user-specified email address and/or sound an alarm system in response to detecting an unknown wireless device. List of proximity events 412, list of departure events 417, and list of unknown device events 422 may include other features not depicted in FIG. 5.

FIG. 6 is an embodiment of a data table 600 for managing events associated with a wireless detection program. Data table 600 may be stored in a data store, such as, but not limited to, data store 320 depicted in FIG. 3. Data table 600 illustrates a pictorial representation of a data table and does not imply a particular implementation, design, and/or architecture. In the depicted embodiment, data table 600 includes a device nickname column 602, residential wireless access point identifier column 604, wireless device identifier column 606, event conditions column 608, and event column 610.

Device nickname column 602 contains the nicknames of wireless devices associated with a user. In some embodiments, a device nickname may be specified at the time of associating a wireless device with a particular residential wireless access point. For example, in some embodiments, a device nickname data field may be added to graphical user interface 400 to associate a nickname with particular wireless device. The nicknames enable a user to easily identify a particular wireless device and configure the events to be associated with the wireless device.

Residential wireless access point identifier column 604 contains an identifier associated with a residential wireless access point, such as, but not limited to, residential wireless access point 102. As depicted in FIG. 6, a user may configure events associated with one or more residential wireless access point. For example, in some embodiments, a user may monitor a child's whereabouts by associating a wireless device of the child 620 with multiple residential wireless access points, such as, but not limited to, residential wireless access point 622 and residential wireless access point 624. For instance, a text message may be sent to John's father when a wireless device of John's, such as, but not limited to, John's cell phone is no longer detected by a first residential wireless access point (e.g., located at school) and another text message may be sent to John's father when John's cell phone is detected by a second residential wireless access point (e.g., located at home).

Wireless device identifier column 606 contains the identifiers of wireless devices associated with the corresponding identifiers in residential wireless access point identifier column 604. In some embodiments, the identifier of a wireless device may be a MAC address 628 of a network device associated with the wireless device. In addition, in some embodiments, the identifier of a wireless device may be a telephone number 630 associated with the wireless device. The wireless device identifier is included in a signal broadcasted by the wireless device and is used by wireless device detection program 300 to identify a particular device.

Event conditions column 608 contains the conditions to be associated a particular event. In some embodiments, the condition may be as simple as the detection of a particular wireless device. However, in some embodiments, the condition may include Boolean logic, such as, but not limited to, event condition 634. Boolean logic is a system of logic that utilizes true and false variables for evaluating a condition. As an example, event condition 634 may be interpreted as detecting John's phone and not detecting Mom's phone. Further, in some embodiments, an event condition, such as, but not limited to, event condition 636 may be associated with the detection and/or absence of one or more wireless devices.

Event column 610 contains the events to perform if the corresponding event conditions are satisfied for the associated wireless devices and residential wireless access points. In some embodiments, event column 610 may include more than one event to perform in response to satisfying the event conditions, such as, but not limited to, event 642. In addition, in some embodiments, event column 610 may also include, but is not limited to, a conditional statement (e.g., an if-else-statement), such as, but not limited to, depicted event 640.

Figure 7:
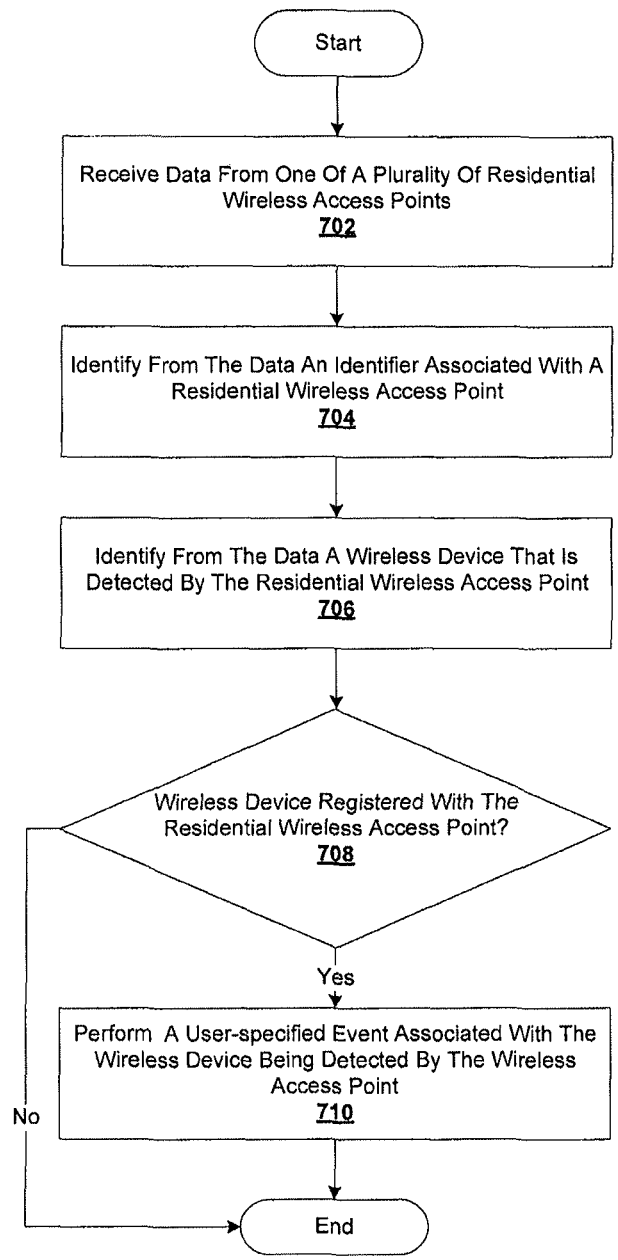
FIG. 7 is an embodiment of a process for executing an event associated with the detection of a wireless device.

With reference now to FIG. 7, an embodiment of a process 700 for executing an event associated with the detection of a wireless device is presented. Process 700 begins by receiving data from one of a plurality of residential wireless access points at step 702. At step 704, the process identifies from the data an identifier associated with a residential wireless access point. The process identifies from the data a wireless device that is detected by the residential wireless access point at step 706. The process, at step 708, determines whether the wireless device is registered with the residential wireless access point. In response to the wireless device being registered with the residential wireless access point, the process, at step 710, performs an event associated with the wireless device being detected by the residential wireless access point, with the process terminating thereafter.

Figure 8:
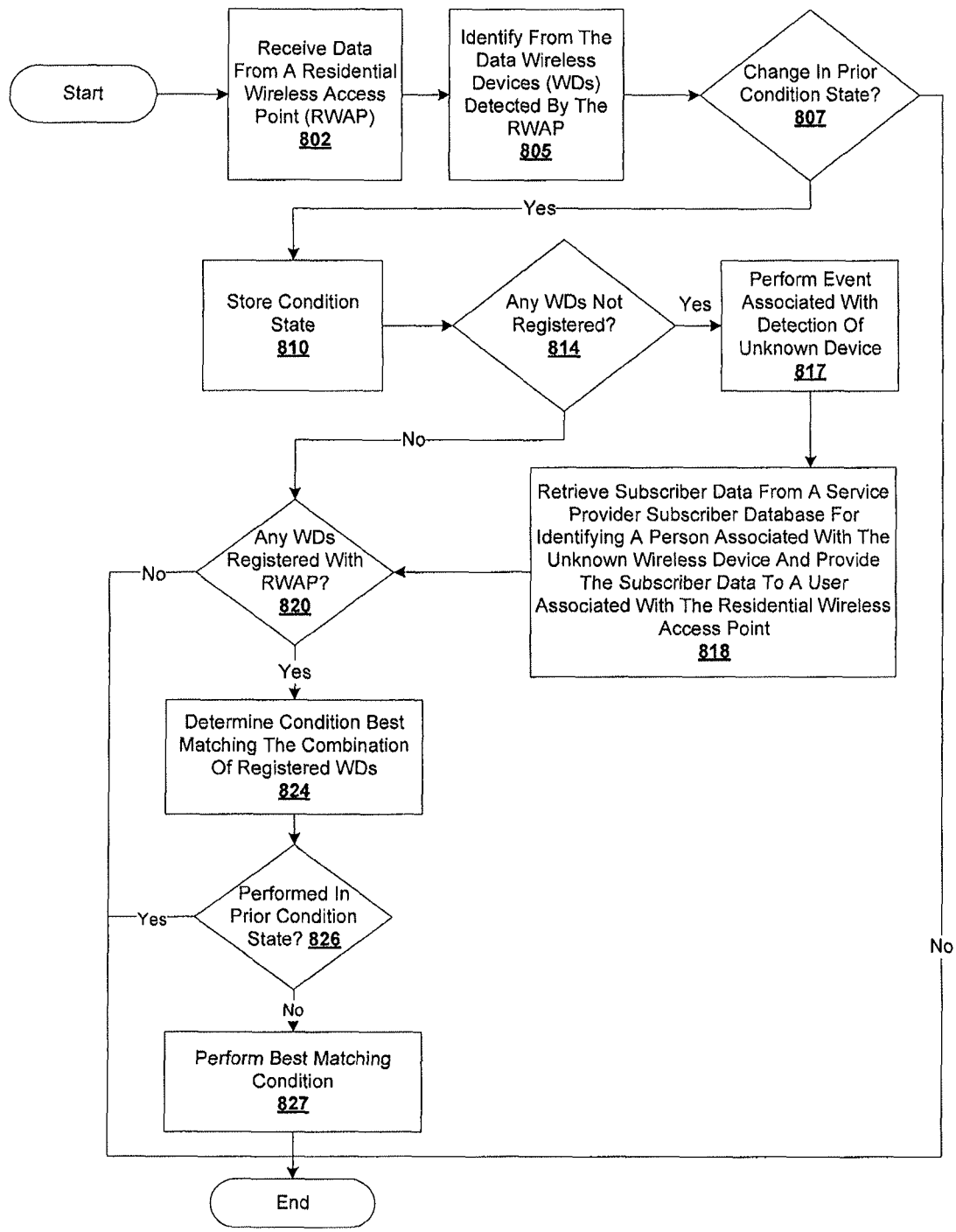
FIG. 8 is another embodiment of a process for executing an event associated with the detection of a wireless device.

FIG. 8 is another embodiment of a process 800 for executing an event associated with the detection of a wireless device. Process 800 begins by receiving data from a residential wireless access point at step 802. At step 804, the process identifies from the data a wireless device that is detected by the residential wireless access point. The process, at step 807, determines whether a change in the prior condition state has occurred. For example, a change occurs if a new wireless device is detected and/or if a previously detected wireless device is no longer detected. If a change in the prior condition state has not occurred, the process terminates.

However, if a change in the prior condition state has occurred, the process stores the new condition state (i.e., updates the condition state) at step 810. At step 814, the process determines whether any of the identified wireless devices are not registered/associated with the residential wireless access point. If the process determines that non-registered/unknown devices have been detected by the residential wireless access point, the process performs the events associated with the detection of an unknown device at step 817. In addition, in some embodiments, if the process determines that a non-registered/unknown device has been detected by the residential wireless access point, the process, at step 818, retrieves subscriber data from a service provider subscriber database for identifying a person associated with the unknown wireless device and provides the subscriber data to a user associated with the residential wireless access point.

At step 820, the process determines with whether any of the identified wireless devices are registered with the detecting residential wireless access point. If the process determines that none of the identified wireless devices are registered with the detecting residential wireless access point (i.e., all detected wireless devices are unknown), the process terminates.

However, if the process, at step 820, determines that one or more of the identified wireless devices are registered with the detecting residential wireless access point, the process, at step 824, determines the condition(s) that best satisfies the detection of the one or more of the identified wireless devices. For example, suppose registered wireless devices A, B, and C are identified/detected by a residential wireless access point. If a condition matching the detection of B and C exists and a condition matching the detection of all three exists, then the process selects the condition matching the detection of all three wireless devices. In some embodiments, if multiple equal conditions exist, the process may perform all the matching events associated with the multiple equal conditions if the multiple matching events do not conflict with one another. Alternatively, in some embodiments, a user may assign a priority level to an event to prioritize events in case multiple conditions are satisfied.

At step 826, the process determines whether the condition(s) that best satisfies the detection of the one or more of the identified wireless devices was performed in the prior condition state. If the process determines that the condition(s) that best satisfies the detection of the one or more of the identified wireless devices was performed in the prior condition state, then the process terminates. If the condition(s) that best satisfies the detection of the one or more of the identified wireless devices was not performed in the prior condition state, the process performs the condition(s) that best satisfies the detection of the one or more of the identified wireless devices at step 828, with the process terminating thereafter. For example, suppose the users associated with registered wireless devices A, B, and C are located in residential location 108 (e.g., family of three watching television) and a person carrying an unknown wireless device approaches the front door of residential location 108, the process would detect the unknown wireless device and perform the events associated with the detection of an unknown device at step 817, such as, but not limited to, sending an email to a specified user. However, the process would not repeat the previously performed condition that best satisfies the detection of the registered wireless devices A, B, and C because the state of the registered wireless devices have not changed.

Accordingly, the disclosed embodiments provide a system and method for managing events associated with the detection of wireless devices. The disclosed embodiments utilize a residential wireless access point for detecting the signal transmitted by a wireless device, such as, but not limited to, a cellular phone. A user configures a wireless device detection program to perform specified events in response to the detection and/or absence of a wireless device. The disclosed embodiments may provide home automation functions, home security functions, and/or provide child monitoring features.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments described above with reference to flowchart illustrations and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing a user-specified event comprising:
   receiving data from a residential wireless access point;
   determining from the data, using a processor, whether a first wireless device is detected;
   determining whether the first wireless device has departed from a signal range of the residential wireless access point by monitoring the strength of a signal associated with the first wireless device, wherein the signal range is controlled by a user preference to configure a location range in which devices are detected;
      wherein if the monitored signal strength gradually decreases, it is determined that the first wireless device has departed from the signal range of the residential access point;
      wherein if the monitored signal strength is constant for a period of time and abruptly ends, it is determined that the first wireless device has not departed from the signal range of the residential wireless access point and that the first wireless device has lost power; and
   performing a user-specified departure event in response to identifying the departure of the first wireless device from the signal range of the residential access point;
   determining from the data, using the processor, whether the first wireless device is an unknown device;
   performing a user-specified event in response to the determination that the first device is an unknown device.

2. The method of claim 1, further comprising:
   storing a condition state associated with the first wireless device being detected by the residential wireless access point.

3. The method of claim 2, further comprising:
   receiving subsequent data from the residential wireless access point;
   determining if the condition state associated with the first wireless device being detected by the residential wireless access point has changed; and
   responsive to the condition state having been changed, performing a second user-specified event associated with a change in condition state.

4. The method of claim 1, wherein the user-specified departure event comprises adjusting a thermostat setting.

5. The method of claim 1, wherein the user-specified departure event includes transmitting an email message to a specified address.

6. The method of claim 1, wherein the user-specified departure event comprises transmitting a text message to a specified number.

7. The method of claim 1, wherein the user-specified departure event comprises turning off audio or video equipment.

8. The method of claim 1, wherein the user-specified departure event comprises turning on or off one or more lights.

9. The method of claim 1, wherein the user-specified departure event comprises turning on an alarm system.

10. The method of claim 1, wherein the user-specified departure event is time dependent.

11. An computer system, comprising:
    a data bus system;
    memory coupled to the data bus system, wherein the memory includes computer usable program code;
    a network communication device coupled to the data bus for receiving data from a residential wireless access point over a network connection;
    a processing unit coupled to the data bus system, wherein the processing unit executes the computer usable program code to:
      receive data from a residential wireless access point;
      determine from the data whether a first wireless device is detected;
      determine whether the first wireless device has departed from a signal range of the residential wireless access point by monitoring the strength of a signal associated with the first wireless device, wherein the signal range is controlled by a user preference to configure a location range in which devices are detected;
        wherein if the monitored signal strength gradually decreases, it is determined that the first wireless device has departed from the signal range of the residential access point;
        wherein if the monitored signal strength is constant for a period of time and abruptly ends, it is determined that the first wireless device has not departed from the signal range of the residential wireless access point and that the first wireless device has lost power; and
      perform a user-specified departure event in response to identifying the departure of the first wireless device from the signal range of the residential access point;
      determine from the data, using the processor, whether the first wireless device is an unknown device;
      perform a user-specified event in response to the determination that the first device is an unknown device.

12. The computer system of claim 11, wherein the processing unit further executes the computer usable program code to:
    store a condition state associated with the first wireless device being detected by the residential wireless access point.

13. The computer system of claim 12, wherein the processing unit further executes the computer usable program code to:
    receive subsequent data from the residential wireless access point;
    determine if the condition state associated with the first wireless device being detected by the residential wireless access point has changed; and
    responsive to the condition state having been changed, perform a second user-specified event associated with a change in condition state.

14. The computer system of claim 11, wherein the user-specified departure event comprises adjusting a thermostat setting.

15. The computer system of claim 11, wherein the user-specified departure event includes transmitting an email message to a specified address.

16. The computer system of claim 11, wherein the user-specified departure event comprises transmitting a text message to a specified number.

17. The computer system of claim 11, wherein the user-specified departure event comprises turning off audio or video equipment.

18. The computer system of claim 11, wherein the user-specified departure event comprises turning on or off one or more lights.

19. The computer system of claim 11, wherein the user-specified departure event comprises turning on an alarm system.

20. The computer system of claim 11, wherein the user-specified departure event is time dependent.

\* \* \* \* \*